United States Patent
Ham

(10) Patent No.: US 9,168,832 B2
(45) Date of Patent: Oct. 27, 2015

(54) SYSTEM FOR CONTROLLING SPEED OF VEHICLE ON CURVED ROAD AND METHOD THEREOF

(71) Applicant: HYUNDAI MOBIS CO., LTD., Seoul (KR)

(72) Inventor: Jun Ho Ham, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/176,844

(22) Filed: Feb. 10, 2014

(65) Prior Publication Data

US 2015/0134222 A1   May 14, 2015

(30) Foreign Application Priority Data

Nov. 28, 2013 (KR) .................. 10-2013-0146177

(51) Int. Cl.
*B60K 31/00* (2006.01)

(52) U.S. Cl.
CPC .................. *B60K 31/0066* (2013.01)

(58) Field of Classification Search
CPC .. B60K 31/00; B60K 31/0008; B60K 31/047; B60W 10/06; B60W 10/18; B60W 30/16; B60W 2720/106
USPC ............................................. 701/70, 93, 96
See application file for complete search history.

(56) References Cited

U.S. PATENT DOCUMENTS

| | | | |
|---|---|---|---|
| 6,185,489 B1 * | 2/2001 | Strickler ................. | 701/31.9 |
| 6,725,145 B1 * | 4/2004 | Takahashi .................. | 701/70 |
| 7,774,121 B2 * | 8/2010 | Lee et al. ................. | 701/70 |
| 8,478,499 B2 * | 7/2013 | Rupp et al. ................. | 701/93 |
| 2002/0095255 A1 * | 7/2002 | Minowa et al. .............. | 701/96 |
| 2005/0010351 A1 * | 1/2005 | Wagner et al. .............. | 701/96 |
| 2005/0187694 A1 * | 8/2005 | Shiiba et al. ............... | 701/70 |
| 2005/0234626 A1 * | 10/2005 | Shiiba et al. ............... | 701/70 |
| 2005/0246091 A1 * | 11/2005 | Kuroda et al. .............. | 701/200 |
| 2006/0190158 A1 * | 8/2006 | Shiiba et al. ............... | 701/70 |
| 2007/0100532 A1 * | 5/2007 | Miyajima et al. ........... | 701/95 |
| 2007/0150157 A1 * | 6/2007 | Lee et al. ................... | 701/93 |
| 2007/0168092 A1 * | 7/2007 | Knox et al. ................ | 701/37 |
| 2007/0168119 A1 * | 7/2007 | Mori ......................... | 701/207 |

(Continued)

FOREIGN PATENT DOCUMENTS

JP          2001093094 A  *  4/2001  .............. G08G 1/16

OTHER PUBLICATIONS

Machine Translation of JP 2001093094A, published Apr. 6, 2001 by Japan Patent Office, pp. 1-12.*

*Primary Examiner* — Mary Cheung
*Assistant Examiner* — Atul Trivedi
(74) *Attorney, Agent, or Firm* — NSIP Law

(57) ABSTRACT

Disclosed is a system and method for controlling a speed of a vehicle on a curved road according to the present invention. The system for controlling a speed of a vehicle on a curved road according to the present invention includes: a trace corrector configured to correct a trace of a curved road on which the vehicle is to be driven; a curvature calculator configured to calculate a curvature based on feature points of the corrected driving trace; a proper speed calculator configured to calculate a proper speed for each feature point of the driving trace based on the calculated curvature; and a curved road goal acceleration calculator configured to determine a speed control point for controlling a speed based on the calculated proper speed, and to calculate a curved road goal acceleration of the determined speed control point.

14 Claims, 8 Drawing Sheets

(56) References Cited

U.S. PATENT DOCUMENTS

| | | |
|---|---|---|
| 2009/0037062 A1* | 2/2009 | Lee et al. ............... 701/70 |
| 2009/0198426 A1* | 8/2009 | Yasui et al. ............ 701/70 |
| 2009/0319138 A1* | 12/2009 | Kondou et al. ......... 701/55 |
| 2010/0204896 A1* | 8/2010 | Biondo et al. .......... 701/93 |
| 2011/0301802 A1* | 12/2011 | Rupp et al. ............. 701/29 |
| 2012/0136549 A1* | 5/2012 | Bradai et al. ........... 701/93 |
| 2013/0332044 A1* | 12/2013 | Um et al. ................ 701/93 |

* cited by examiner

SYSTEM FOR CONTROLLING SPEED OF VEHICLE ON CURVED ROAD AND METHOD THEREOF

CROSS-REFERENCE TO RELATED APPLICATIONS

This application claims priority to and the benefit of Korean Patent Application No. 10-2013-0146177 filed in the Korean Intellectual Property Office on Nov. 28, 2013, the entire contents of which are incorporated herein by reference.

TECHNICAL FIELD

The present invention relates to a method of controlling a speed on a curved road, and more particularly, to a system and method for controlling a speed of a vehicle on a curved road using a curvature of a driving trace.

BACKGROUND ART

Speeding causes a large number of car accidents and also increases damage resulting from such accident. Accordingly, the market of vehicular automatic cruise control products has been gradually expanded. That is, products to which a cruise control method of maintaining a vehicle at a set speed and an adaptive cruise control method of maintaining a proper distance between vehicles are applied have been widely distributed.

With a generalized use of a navigation system, the market for the navigation system is also growing and thus, the spread of a system associated with the navigation is predicted to increase. The system extracts a shape of a driving road from a map, calculates a curvature indicating a curved level of the road based on the extracted shape of the road, and controls a speed based on the calculated curvature.

However, it is difficult to calculate a precise road curvature using a precision of a general map used for navigation or guide. To solve the above issue, research on highly precise map production and precise measurement has been conducted. However, large amounts of costs and time are required to achieve the actual commercialization thereof.

SUMMARY OF THE INVENTION

The present invention has been made in an effort to provide a system and method for controlling a speed of a vehicle on a curved road that acquires shape information of a road ahead, corrects the acquired shape information based on a predetermined performance index and a constraint condition, calculates a curvature based on the corrected shape information, and calculates a proper speed based on the calculated curvature.

However, an object of the present invention is not limited to the aforementioned matters and other objects not described above will be clearly understood by those skilled in the art from the following description.

An exemplary embodiment of the present invention provides a system for controlling a speed of a vehicle on a curved road, the system including: a trace corrector configured to correct a trace of a curved road on which the vehicle is to be driven, as a result of moving locations of feature points in a predetermined direction by a predetermined distance when the feature points are acquired from a curved road section in which the vehicle is to be driven; a curvature calculator configured to calculate a curvature based on feature points of the corrected driving trace; a proper speed calculator configured to calculate a proper speed for each feature point of the driving trace based on the calculated curvature; and a curved road goal acceleration calculator configured to determine a speed control point for controlling a speed based on the calculated proper speed, and to calculate a curved road goal acceleration of the determined speed control point.

The trace corrector may select the predetermined number of continuous feature points from among the acquired feature points, and move a central feature point among the selected feature points in the predetermined direction or by the predetermined distance, may calculate a curvature of a feature point before being moved and a curvature of a feature point after being moved, and may compare the calculated curvatures, determine locations of feature points of the driving trace based on the comparison result, and correct the driving trace based on the feature points of which the locations are determined.

The trace corrector may select five continuous feature points from among the acquired feature points, may set, as a single set, at least three feature points among the five feature points, and may calculate a curvature of each set.

The trace corrector may compare performance indices of the calculated curvatures, and may determine locations of the feature points of the driving trace using feature points having relatively low performance indices of the curvatures based on the comparison result. Here, the performance index may be an index indicating a performance of a curvature and a smaller performance index may indicate a more excellent performance.

The curvature calculator may calculate the curvature based on at least three feature points among the feature points of the corrected driving trace.

The proper speed calculator may calculate the proper speed $v$ according to the following equation $v=\sqrt{a_y \cdot R}$. Here, $a_y$ denotes a predetermined proper pass lateral acceleration and $R$ denotes a radius of curvature.

The system for controlling a speed of a vehicle on a curved road may further include: a signal processor configured to receive, from a vehicle radar, a signal reflected from a target, to perform signal processing of the received signal, and to extract target information including a travel speed and a travel distance of the target as the signal processing result; a target selector configured to select a target based on the extracted target information; and a target goal acceleration calculator configured to calculate a target goal acceleration based on target information on the selected target.

The system for controlling a speed of a vehicle on a curved road may further include a final goal acceleration calculator configured to calculate a relatively smaller value between the calculated curved road goal acceleration and the target goal acceleration as a final goal acceleration of a corresponding point.

Another exemplary embodiment of the present invention provides a method of controlling a speed of a vehicle on a curved road, the method including: correcting a trace of a curved road on which the vehicle is to be driven, as a result of moving locations of feature points in a predetermined direction by a predetermined distance when the feature points are acquired from a curved road section in which the vehicle is to be driven; calculating a curvature based on feature points of the corrected driving trace; calculating a proper speed for each feature point of the driving trace based on the calculated curvature; and determining a speed control point for controlling a speed based on the calculated proper speed, and calculating a curved road goal acceleration of the determined speed control point.

The correcting of the trace may select the predetermined number of continuous feature points from among the acquired feature points, and move a central feature point among the selected feature points in the predetermined direction or by the predetermined distance, may calculate a curvature of a feature point before being moved and a curvature of a feature point after being moved, and may compare the calculated curvatures, determine locations of feature points of the driving trace based on the comparison result, and correct the driving trace based on the feature points of which the locations are determined.

The correcting of the trace may select five continuous feature points from among the acquired feature points, may set, as a single set, at least three feature points among the five feature points, and may calculate a curvature of each set.

The correcting of the trace may compare performance indices of the calculated curvatures, and may determine locations of the feature points of the driving trace using feature points having relatively low performance indices of the curvatures based on the comparison result. Here, the performance index may be an index indicating a performance of a curvature and a smaller performance index may indicate a more excellent performance.

The calculating of the curvature may calculate the curvature based on at least three feature points among the feature points of the corrected driving trace.

The calculating of the proper speed may calculate the proper speed v according to the following equation $v=\sqrt{a_y \cdot R}$. Here, $a_y$ denotes a predetermined proper pass lateral acceleration and R denotes a radius of curvature.

The method for controlling a speed of a vehicle on a curved road may further include: receiving, from a vehicle radar, a signal reflected from a target, performing signal processing of the received signal, and extracting target information including a travel speed and a travel distance of the target as the signal processing result; selecting a target based on the extracted target information; and calculating a target goal acceleration based on target information on the selected target.

The system for controlling a speed of a vehicle on a curved road may further include calculating a relatively smaller value between the calculated curved road goal acceleration and the target goal acceleration as a final goal acceleration of a corresponding point.

According to exemplary embodiments of the present invention, by acquiring shape information of a road ahead, correcting the acquired shape information based on a predetermined performance index and a constraint condition, calculating a curvature based on the corrected shape information, and calculating a proper speed based on the calculated curvature, it is possible to improve the performance of a curved road speed controlling function of calculating a curvature close to an actual driving trace.

According to exemplary embodiments of the present invention, it is possible to improve the convenience of a driver based on the performance improvement of a curved road speed controlling function.

According to exemplary embodiments of the present invention, a system for controlling a speed on a curved road may be configured using a general map instead of a highly precise map and thus, it is possible to save product cost.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
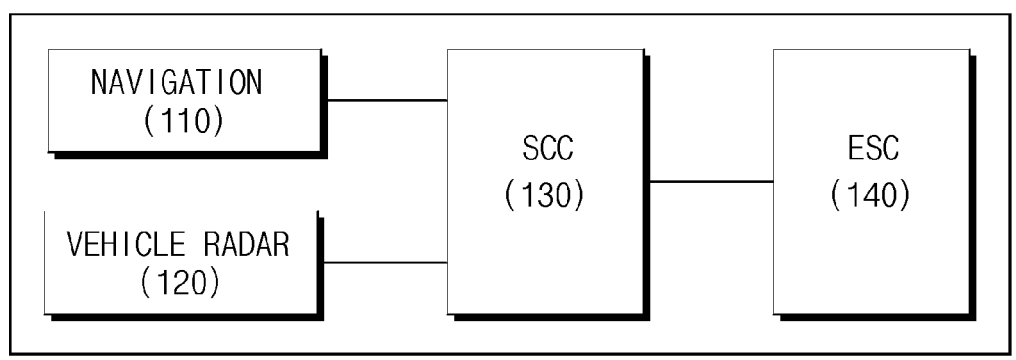
FIG. 1 is a block diagram illustrating a system for controlling a speed of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a system and method for controlling a speed of a vehicle on a curved road according to exemplary embodiments of the present invention will be described with reference to the accompanying drawings. A description will be made in detail based on a portion required to understand an operation and effect according to the present invention.

When describing constituent elements of the present invention, different reference numerals may be assigned to like constituent elements based on drawings. Although they are illustrated in different drawings, like reference numerals may also be assigned to like constituent elements. However, even in this case, it does not indicate that a corresponding constituent element has a different function based on exemplary embodiments, or does not indicate that the corresponding constituent element has the same function in different exemplary embodiments. A function of each constituent element needs to be determined based on a description related to each constituent element in a corresponding exemplary embodiment.

In particular, the present invention proposes a new method of acquiring shape information of a road ahead, correcting the acquired shape information based on a set performance index and constraint condition, calculating a curvature based on the corrected shape information, and calculating a proper speed based on the calculated curvature.

FIG. 1 is a block diagram illustrating a system for controlling a speed of a vehicle according to an exemplary embodiment of the present invention.

As illustrated in FIG. 1, the system for controlling a speed of a vehicle according to the present invention may include a navigation 110, a vehicle radar 120, a smart cruise control (SCC) 130, and an electronic stability control (ESC) 140.

The navigation 110 may provide shape information of a trace corresponding to a current curved shape on which the vehicle is to be driven.

The vehicle radar 120 may receive a signal reflected from a target and provide the received signal.

The SCC 130 may be provided with the shape information of the trace corresponding to the curved road from the navigation 110 and the signal from the vehicle radar 120, and may calculate a final goal acceleration of a speed control point within the curved road based on the provided shape information and signal.

Here, the SCC 130 may correct a driving trace of a road based on acquired feature points of the road, may calculate a final curvature based on feature points of the corrected driving trace, may calculate a proper speed for each feature point of the driving trace based on the calculated final curvature, may calculate a proper speed of a corresponding feature point based on the calculated final curvature and a predetermined proper pass lateral acceleration, may determine a speed control point for controlling a speed based on the calculated proper speed, and may calculate a curved road goal acceleration of the determined speed control point.??

The SCC 130 may receive, from the vehicle radar 120, a signal reflected from a target, may perform signal processing of the received signal, may extract information such as a travel speed and a travel distance of the target as the signal processing result, may select the target based on the extracted information, and may calculate a target goal acceleration of the target based on information of the selected target.

Accordingly, the SCC 130 may calculate a final goal acceleration of a corresponding point based on the curved road goal acceleration calculated using information provided from the navigation 110 and the target goal acceleration calculated using information provided from the vehicle radar 120.

The ESC 140 may be provided with the calculated final goal acceleration and may control a driving device and a braking device of the vehicle driving on the curved road based on the provided final goal acceleration.

Figure 2:
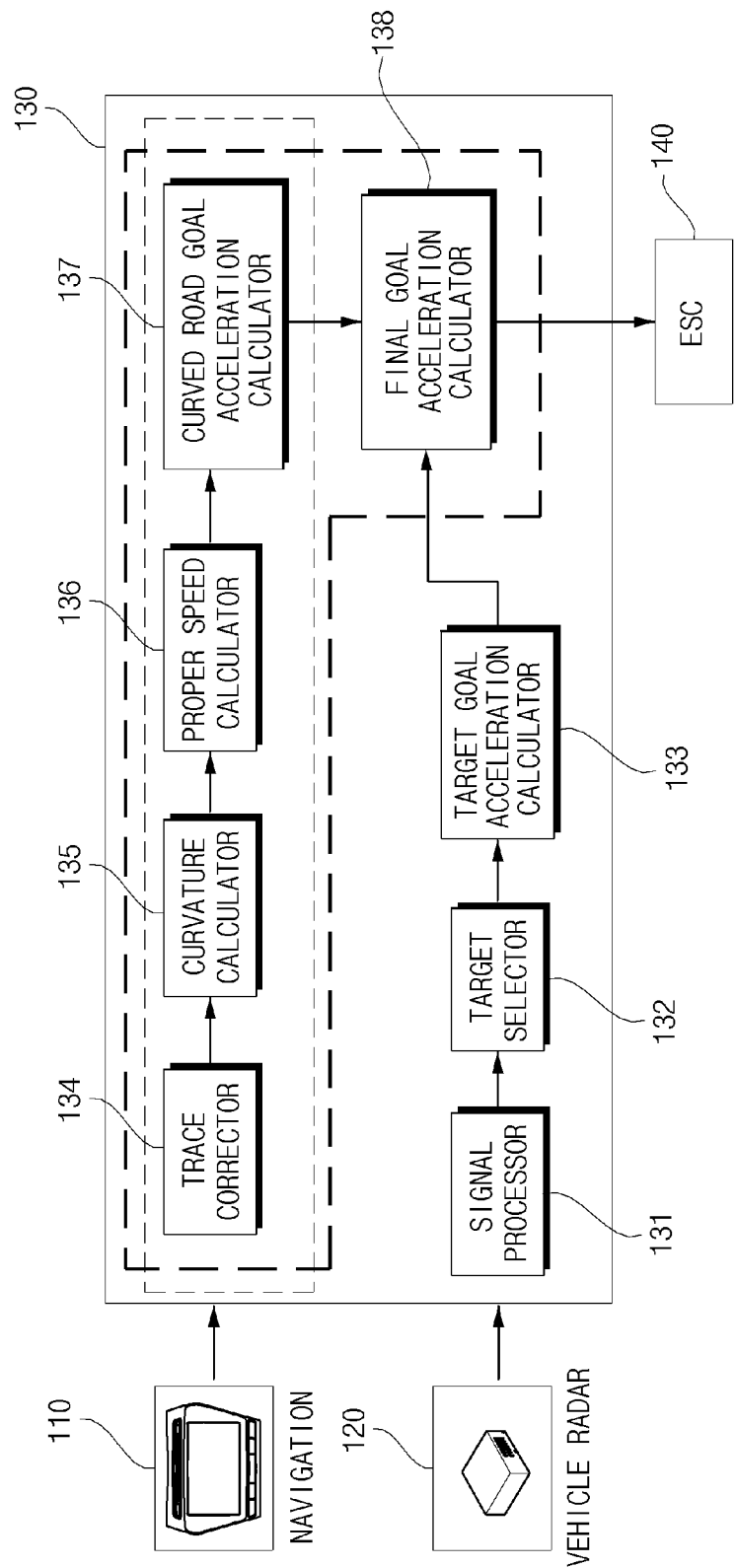
FIG. 2 is a block diagram illustrating a detailed configuration of a smart cruise control (SCC) according to an exemplary embodiment of the present invention.

FIG. 2 is a block diagram illustrating a detailed configuration of an SCC 130 according to an exemplary embodiment of the present invention.

As illustrated in FIG. 2, the SCC 130 according to the present invention may include a signal processor 131, a target selector 132, a target goal acceleration calculator 133, a trace corrector 134, a curvature calculator 135, a proper speed calculator 136, a curved road goal acceleration calculator 137, and a final goal acceleration calculator 138.

The signal processor 131 may receive a signal reflected from the target, may perform signal processing of the received signal, and may extract information such as a travel speed and a travel distance of the target as the signal processing result.

The target selector 132 may select the target based on the extracted information.

The target goal acceleration calculator 133 may calculate a target goal acceleration of the corresponding target based on information such as the travel speed and the travel distance of the selected target.

The trace corrector 134 may acquire, from navigation, feature points of a trace corresponding to the driving curved road, and may correct locations of the acquired feature points based on a predetermined performance index and constraint condition.

Figure 3:
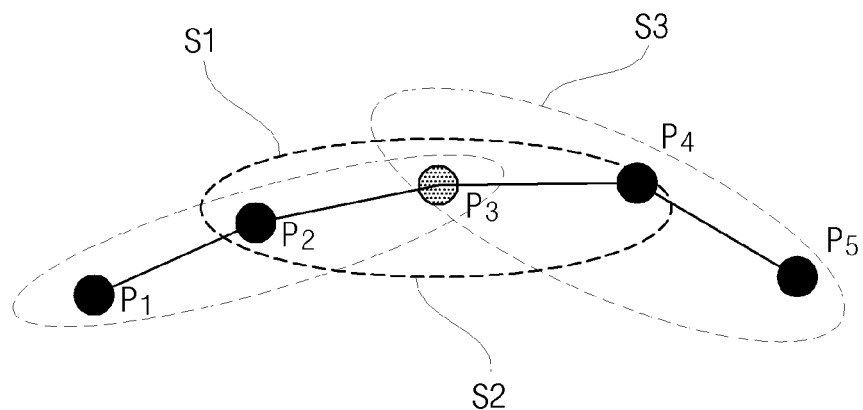
FIG. 3 is a diagram to describe a principle of correcting a trace according to an exemplary embodiment of the present invention.

FIG. 3 is a diagram to describe a principle of correcting a trace according to an exemplary embodiment of the present invention.

As illustrated in FIG. 3, the trace corrector 134 may select five continuous feature points P1, P2, P3, P4, and P5 from among features points of a trace within a driving curved road, acquired from navigation. Here, an interval between the feature points of the trace may be modified based on a demand of a designer.

The trace corrector 134 may acquire a total of three sets S1={P1, P2, P3}, S2={P2, P3, P4}, and S3={P3, P4, P5} by setting, as a single set, three continuous feature points among the selected five feature points P1, P2, P3, P4, and P5.

The trace corrector 134 may calculate curvatures C1, C2, and C3 with respect to the respective set sets.

Figure 4:
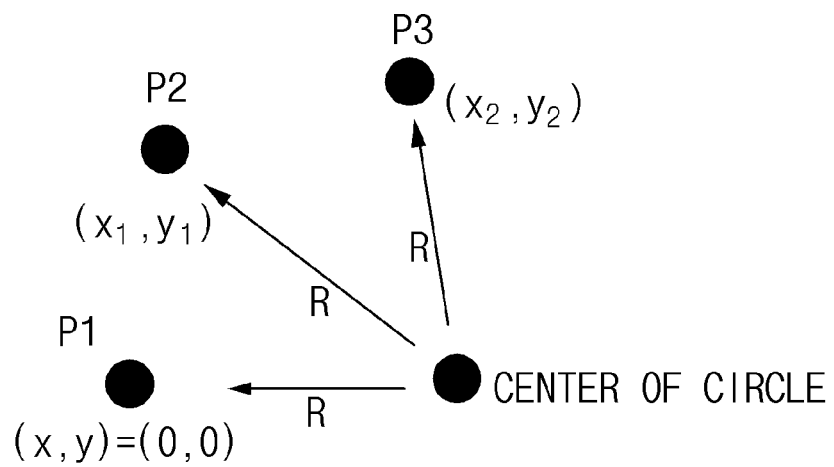
FIG. 4 is a diagram to describe a principle of calculating a curvature according to an exemplary embodiment of the present invention.

FIG. 4 is a diagram to describe a principle of calculating a curvature according to an exemplary embodiment of the present invention.

As illustrated in FIG. 4, when three points P1, P2, and P3 are given, the trace corrector 134 may calculate a curvature of a circle that passes the given three points P1, P2, and P3, and may calculate the curvature of the circle using the point P1 as a starting point and passing the points P1, P2, and P3. The curvature may be expressed by the following Equation 1.

$$C = \frac{1}{R} = \sqrt{\frac{4(x_1 y_2 - x_2 y_1)^2}{(x_1^2 + y_1^2)(x_2^2 + y_2^2)[(x_1 - x_2)^2 + (y_1 - y_2)^2]}} \quad \text{[Equation 1]}$$

Here, R denotes the radius of curvature, (x1, y1) denotes coordinates of the point P2, and (x2, y2) denotes coordinates of the point P3. Coordinates (x, y) of the point P1 is a starting point and thus, (0, 0).

The trace corrector 134 may acquire P3' by selecting one feature point P3 that is located in the middle of the five feature points P1, P2, P3, P4, and P5, and is to be moved, and by moving the selected feature point P3 in a predetermined direction by a predetermined distance.

The trace corrector 134 may acquire a total of three sets S1', S2', and S3' by setting, as a single set, three continuous feature points among five feature points P1, P2, P3', P4, and P5 including the moved feature point P3'.

The trace corrector 134 may calculate curvatures C1', C2', and C3' with respect to the respective set sets S1', S2', and S3'.

The trace corrector 134 may verify performance indices and constraint conditions of the curvatures C1, C2, and C3 calculated with respect to P3 and the curvatures C1', C2', and C3' with respect to P3', and may determine feature points of the driving trace based on the verification result.

When the performance index of the curvature with respect to P3' is lower and satisfies a constraint condition, features points of the driving trace may be corrected as P1, P2, P3', P4, and P5.

Here, the performance index is an index indicating a performance of a curvature and a smaller performance index indicates a more excellent performance. The performance index may be set in various forms based on a demand of a designer or a necessity. For example, the largest absolute value among absolute values of curvatures may be set as the smallest performance index, or the largest change amount between the curvatures may be set as the smallest performance index.

The constraint condition is a condition indicating the tolerance range of a feature point to be corrected and may be set in various forms based on a demand of the designer or a necessity. The constraint condition may be set as a condition that a feature point to be corrected needs to be present within a predetermined distance from an original feature point.

The trace corrector 134 repeats the trace correcting process with respect to all the feature points of the driving trace. That is, the trace corrector 134 selects five continuous feature points P2, P3, P4, P5, and P6 in a subsequent period and performs again the trace correcting process.

Figure 5:
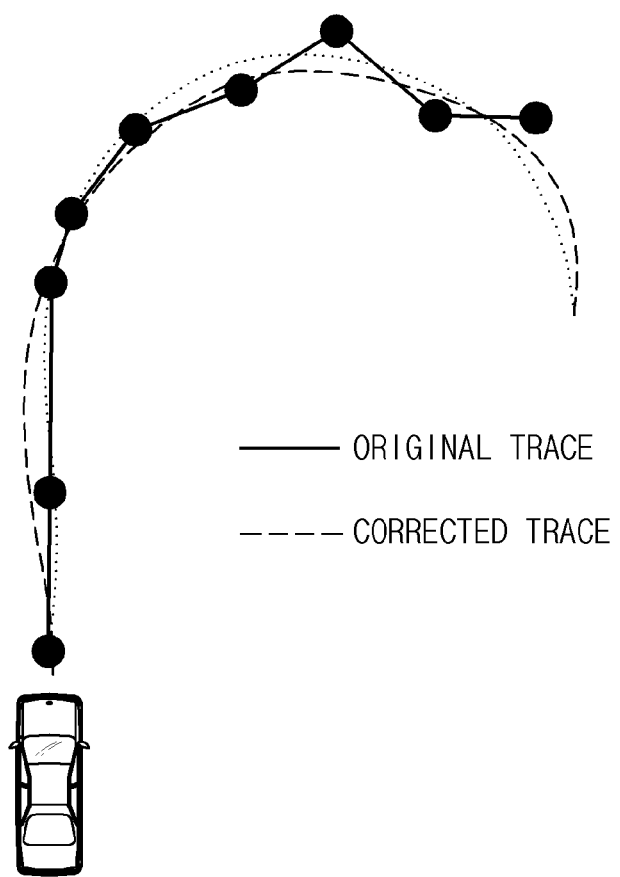
FIG. 5 is a diagram illustrating a corrected driving trace according to an exemplary embodiment of the present invention.

FIG. 5 is a diagram illustrating a corrected driving trace according to an exemplary embodiment of the present invention.

As illustrated in FIG. 5, the trace corrector 134 may acquire feature points of a corrected driving trace having improved performance indices as compared to feature points of an original driving trace by repeating a trace correcting process with respect to all of the feature points of the driving trace.

Here, the trace corrector 134 may perform the trace correcting process with respect to the feature points of the driving trace sequentially from the closest point to a farther point, or may more frequently repeat the trace correcting process with respect to close points.

Here, a number of corrections or a correction method with respect to the feature points of the driving trace may be set by the designer, and may be modified in various forms based on a demand of the designer, a performance of a system, and the like.

The above trace correcting process performed with respect to the feature points of the driving trace according to the present invention may achieve a variety of effects, such as removing a distortion of a curvature occurring due to very close feature points by selecting a relatively low performance index, applying a driving characteristic of a driver, removing an error of a map location, and the like.

The curvature calculator 135 may calculate a final curvature based on the feature points of the corrected driving trace. That is, the curvature calculator 135 may calculate the final curvature based on at least three feature points among the feature points of the corrected driving trace.

Figure 6:
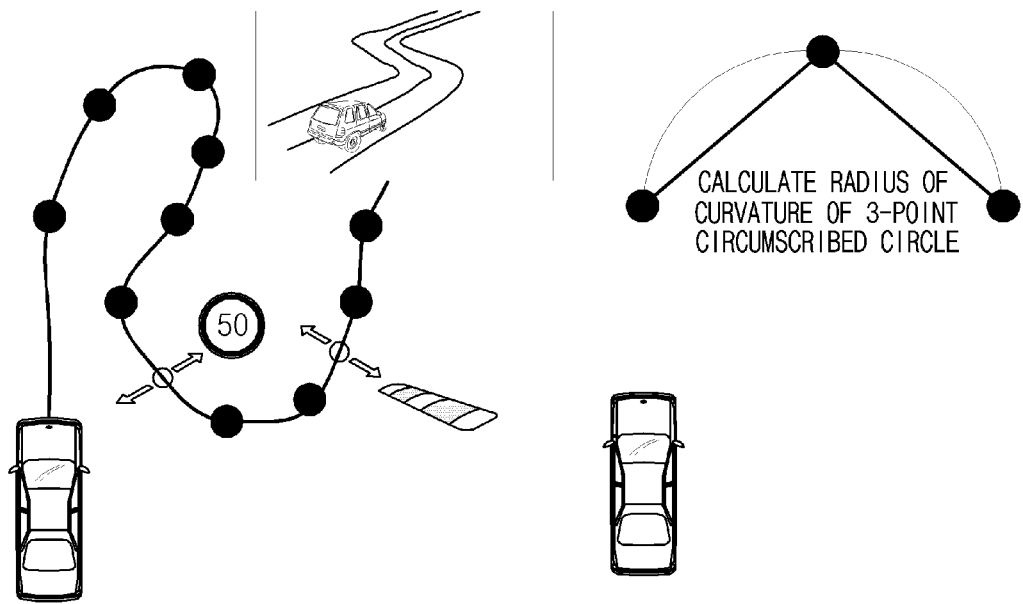
FIG. 6 is a diagram to describe a principle of calculating a final curvature according to an exemplary embodiment of the present invention.

FIG. 6 is a diagram to describe a principle of calculating a final curvature according to an exemplary embodiment of the present invention.

As illustrated in FIG. 6, features points selected to calculate the final curvatures are continuous or discontinuous. For example, feature points P1, P2, and P3 may be selected, or P1, P3, and P5 may be selected.

The curved road proper speed calculator 136 may calculate a proper speed for each feature point of the driving trace based on the calculated final curvature. The proper speed v may be expressed by the following Equation 2.

$$v = \sqrt{a_y \cdot R},$$ [Equation 2]

Here, $a_y$ denotes a proper pass lateral acceleration and R denotes a radius of curvature.

In this instance, the proper pass later acceleration may be predetermined or modified by the designer or the driver, and a weight may be assigned based on a friction coefficient of road or a type of road.

The curved road goal acceleration calculator 137 may select a speed control point for controlling a speed based on the calculated proper speed, and may calculate a curved road goal acceleration of the selected control speed point.

Figure 7:
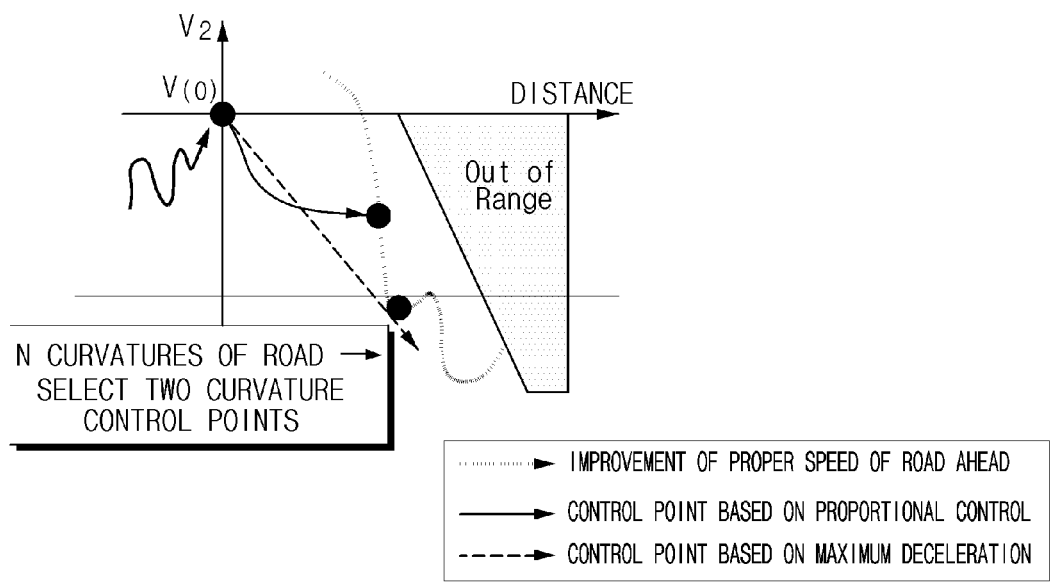
FIG. 7 is a diagram to describe a principle of selecting a speed control point according to an exemplary embodiment of the present invention.

FIG. 7 is a diagram to describe a principle of selecting a speed control point according to an exemplary embodiment of the present invention.

As illustrated in FIG. 7, the speed control point may be selected using various methods such as a speed control point selecting method by a deceleration, a speed control point selecting method by a proportional control, and the like, or a combination of a plurality of methods.

As an example, the speed control point selecting method by a deceleration selects, as the speed control point, a point having the largest value during the deceleration required to satisfy a proper speed of a corresponding point ahead.

When an equivalent deceleration is assumed, a deceleration A required for the deceleration may be expressed by the following Equation 3.

$$A = \frac{v(0)^2 - v_{map}^2}{2 \cdot d}$$ [Equation 3]

Here, v(0) denotes a speed of a currently driving vehicle, $V_{map}$ denotes a proper speed of a corresponding point ahead, and d denotes a distance by the corresponding point ahead.

As another example, the speed control point selecting method by a proportional control selects, as the speed control point, a point having the largest value during the deceleration required to satisfy a proper speed of a corresponding point ahead.

When the speed control point is selected, the curved road goal acceleration calculator 137 calculates a curved road goal acceleration based on a proper speed and a current speed with respect to the selected speed control point.

The final goal acceleration calculator 138 may calculate a final goal acceleration based on the curved road goal acceleration calculated based on information provided from the navigation 110 and the goal acceleration calculated based on information provided from the vehicle radar 120.

For example, the final goal acceleration calculator 138 calculates a final goal acceleration based on the curved road goal acceleration by the navigation 110, calculates a final goal acceleration based on the goal acceleration by the vehicle radar 120, and calculates a relatively smaller value between the calculated two final target goal accelerations as a final goal acceleration of a corresponding point.

In this instance, the final goal acceleration calculator 138 calculates the final goal acceleration based on a predetermined deceleration control characteristic, and the deceleration control characteristic may be defined as the following Table 1.

TABLE 1

| Parameter | Value |
| --- | --- |
| $A_{max}$ | $A_{max} = \{A_{max}(n)|A_1, A_2, A_3, \ldots, A_N\}$ |
| $J_{max}$ | $J_{max} = \{J_{max}(n)|J_1, J_2, J_3, \ldots, J_N\}$ |
| $K_m$ | $K_m = \{K_m(n)|K_1, K_2, K_3, \ldots, K_N\}$ |
| $v_{margine}$ | $v_{margine} = \{v_{margine}(n)|v_1, v_2, v_3, \ldots, v_N\}$ |

Here, $A_{max}$ denotes a maximum tolerance acceleration of a goal acceleration, $J_{max}$ denotes a maximum tolerance change rate of the goal acceleration, $K_m$ denotes a speed proportional control gain or a control speed, and $v_{margine}$ denotes a marginal speed between the proper speed and the goal control speed.

The final goal acceleration $a_i$ calculated based on Table 1 may be expressed by the following Equation 4.

$$a_i = K_m(v_{map} - v_s) \quad \text{[Equation 4]}$$

Here, $K_m$ denotes the speed proportional control gain, $v_{map}$ denotes the target speed, and $v_s$ denotes a speed of a currently driving vehicle and has the same value as v(o) of Equation 3.

The target speed $v_{map}$ may be expressed by the following Equation 5.

$$v_{map} = v_t - v_{margin}(n) \quad \text{[Equation 5]}$$

Here, $v_t$ denotes a proper speed of a speed control point t and $v_{margine}$ denotes a speed margin.

In this instance, the final goal acceleration needs to satisfy $A_{max}$ and $J_{max}$. That is, an absolute value of the final goal acceleration is limited by the maximum tolerance acceleration $A_{max}$, and a change rate of the final goal acceleration is limited by the maximum tolerance change rate $J_{max}$.

For example, in a case in which $A_{max}$ is "2", when the final goal acceleration is calculated as "3", the calculated final goal acceleration is adjusted to be "2". In a case in which $J_{max}$ is "2" and a previous final goal acceleration is "1", when the final goal acceleration is calculated as "4", the calculated final goal acceleration is adjusted to be "3".

Figure 8:
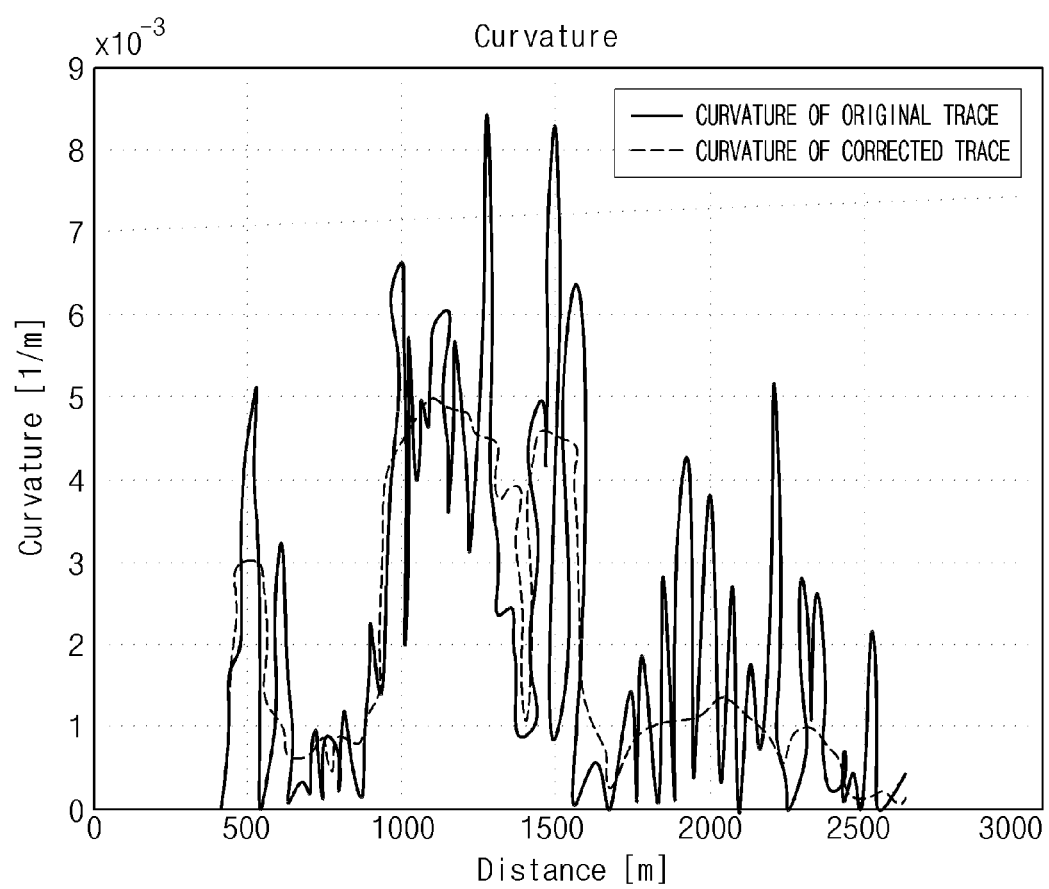
FIG. 8 is a graph illustrating a result of calculating a curvature according to an exemplary embodiment of the present invention.

FIG. 8 is a graph illustrating a result of calculating a curvature according to an exemplary embodiment of the present invention.

As illustrated in FIG. 8, a curvature of a trace of a general map and a curvature of a trace corrected using a proposed method are compared and thereby shown. By correcting the trace using the proposed method, curvature noise occurring due to an error of the general map decreases and approaches an actual driving curvature.

Figure 9:
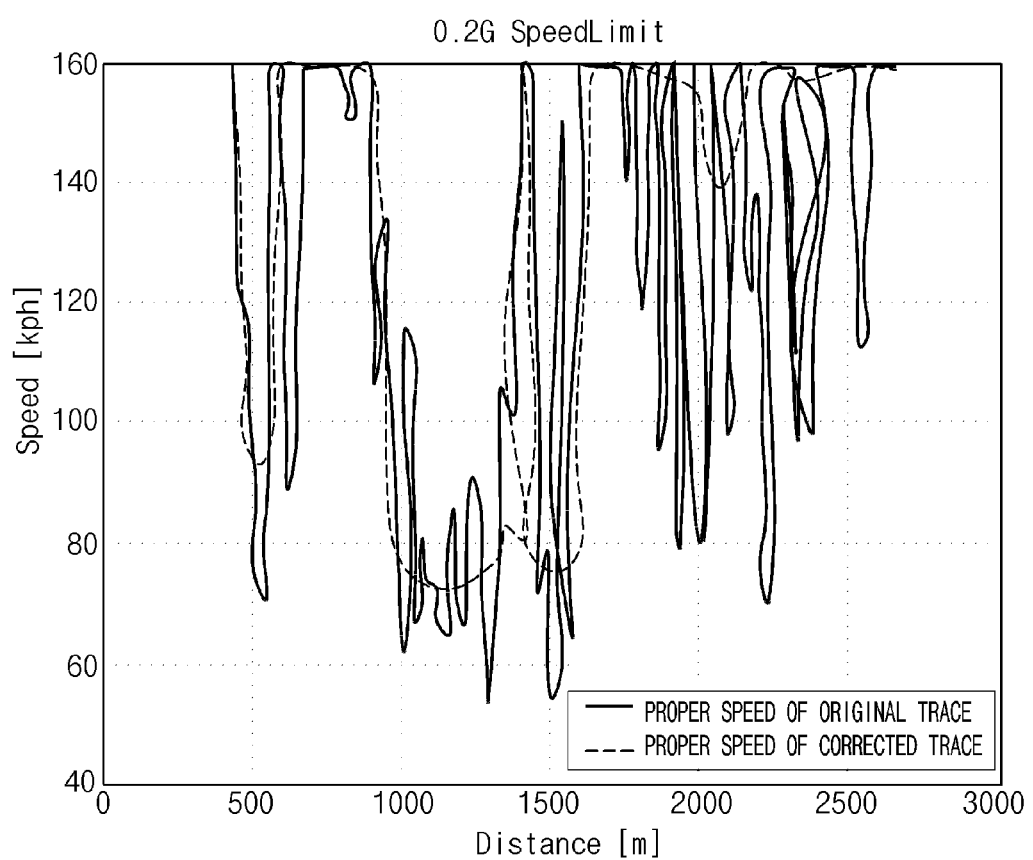
FIG. 9 is a graph illustrating a result of calculating a proper speed according to an exemplary embodiment of the present invention.

FIG. 9 is a graph illustrating a result of calculating a proper speed according to an exemplary embodiment of the present invention.

As illustrated in FIG. 9, proper speeds for the respective feature points within a driving trace when using the curvature of FIG. 7 and setting a proper pass lateral acceleration as "0.2G" are compared and thereby shown.

As described above, using the trace corrected through the method proposed by the present invention, it is possible to remove curvature noise occurring due to a variety of reasons and to provide a smooth curved road speed control.

Figure 10:
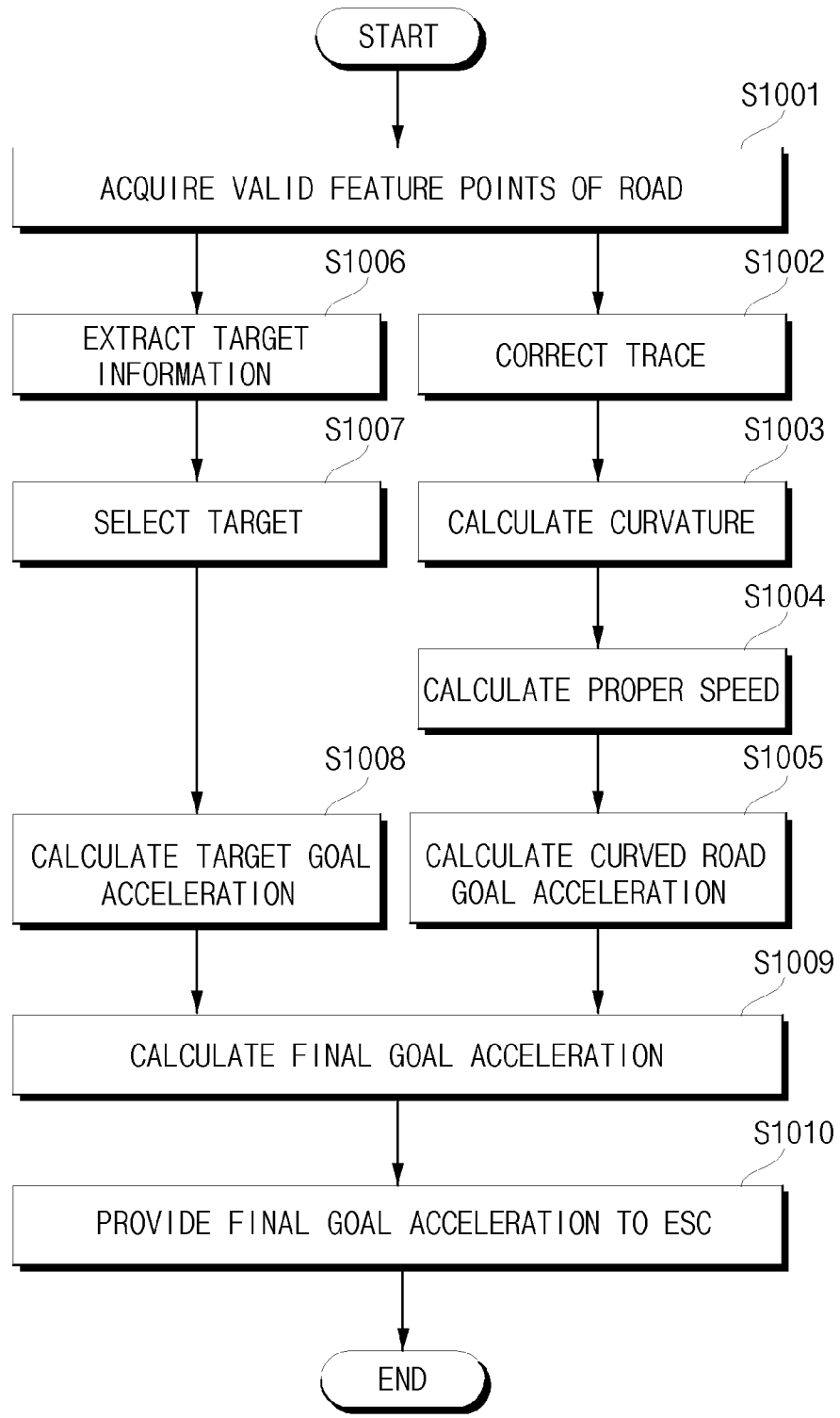
FIG. 10 is a flowchart illustrating a method of controlling a speed of a vehicle according to an exemplary embodiment of the present invention.

FIG. 10 is a flowchart illustrating a method of controlling a speed of a vehicle according to an exemplary embodiment of the present invention.

As illustrated in FIG. 10, a system (hereinafter, referred to as a speed control system) for controlling a speed of a vehicle may acquire valid feature points of a road from a navigation system (S1001).

In this instance, when the speed control system does not acquire the valid feature points of the road from the navigation, a speed control becomes impossible and thus, the speed control system may notify a driver that the speed control is impossible.

Next, the speed control system may correct a trace of a driving road based on the acquired feature points of the road (S1002).

Specifically describing, the speed control system selects a predetermined number of feature points and moves a feature point located at the center among the selected feature points in a predetermined direction or by a predetermined distance.

The speed control system determines locations of the feature points of the driving trace based on a curvature of a feature point before being moved an a curvature of a feature point after being moved, and corrects the trace based on the feature points of which locations are determined.

Next, the speed control system may calculate a final curvature based on the corrected feature points of the driving trace (S1003).

Next, the speed control system may calculate a proper speed for each feature point of the driving trace based on the calculated final curvature (S1004). That is, the speed control system calculates a proper speed of a corresponding feature point based on the calculated final curvature and a predetermined proper pass lateral acceleration.

Next, the speed control system may select a speed control point for controlling a speed based on the calculated proper speed and may calculate a curved road goal acceleration of the selected speed control point (S1005).

Meanwhile, the speed control system may receive, from a vehicle radar, a signal reflected from a target, may perform signal processing of the received signal, and may extract information such as a travel speed and a travel distance of the target as the signal processing result (S1006).

Next, the speed control system may select the target based on the extracted information (S1007).

Next, the speed control system may calculate a target goal acceleration of the corresponding target based on information such as the travel speed and the travel distance of the selected target (S1008).

Next, the speed control system may calculate a final goal acceleration of a corresponding point based on the curved road goal acceleration calculated using information provided from the navigation and the goal acceleration calculated using information provided from the vehicle radar (S1009).

Next, the speed control system may provide the calculated final goal acceleration to an ESC (S1010).

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for controlling a speed of a vehicle on a curved road, the system comprising:
    a trace corrector configured to correct a driving trace of a curved road on which the vehicle is to be driven, based on moving locations of feature points in a predetermined direction, when the feature points are acquired from the curved road;
    a curvature calculator configured to calculate a curvature, based on feature points of the corrected driving trace;
    a proper speed calculator configured to calculate a proper speed for each feature point of the driving trace, based on the calculated curvature; and
    a curved road goal acceleration calculator configured to determine a speed control point for controlling a speed, based on the calculated proper speed, and to calculate a curved road goal acceleration of the determined speed control point;
    wherein the trace corrector is further configured to
        compare performance indices of calculated curvatures of the driving trace, wherein each performance index indicates a performance of a curvature, and wherein a smaller performance index indicates a superior performance, and
        determine locations of the feature points of the driving trace, by using feature points having relatively small performance indices of the curvatures, based on the comparison.

2. The system of claim 1, wherein the trace corrector is further configured to:
    select a number of continuous feature points from among the acquired feature points;
    move a central feature point among the selected feature points, in the predetermined direction or by a predetermined distance;
    calculate a curvature of a feature point before the feature point is moved and a curvature of the feature point after the feature point is moved;
    compare the calculated curvatures of the feature point before and after being moved, to determine locations of feature points of the driving trace; and
    correct the driving trace, based on the feature points of which the locations are determined.

3. The system of claim 2, wherein the trace corrector is further configured to:
    select five continuous feature points from among the acquired feature points, to set, as a single set, at least three feature points among the five feature points, and calculate a curvature of each set.

4. The system of claim 1, wherein the curvature calculator is further configured to calculate the curvature, based on at least three feature points among the feature points of the corrected driving trace.

5. The system of claim 1, wherein the proper speed calculator calculates the proper speed v according to the following equation:

$$v=\sqrt{a_y \cdot R},$$

wherein $a_y$ denotes a predetermined proper pass lateral acceleration and R denotes a radius of curvature.

6. The system of claim 1, further comprising:
    a signal processor configured to receive, from a vehicle radar, a signal reflected from a target, to process the received signal, and to extract target information including a travel speed and a travel distance of the target;
    a target selector configured to select a target, based on the extracted target information; and
    a target goal acceleration calculator configured to calculate a target goal acceleration, based on target information on the selected target.

7. The system of claim 6, further comprising:
    a final goal acceleration calculator configured to calculate a smaller value between the calculated curved road goal acceleration and the target goal acceleration, as a final goal acceleration of a corresponding point.

8. A method of controlling a speed of a vehicle on a curved road, the method comprising:
    correcting a driving trace of a curved road on which the vehicle is to be driven, based on moving locations of feature points in a predetermined direction, when the feature points are acquired from the curved road;
    calculating a curvature, based on feature points of the corrected driving trace;
    calculating a proper speed for each feature point of the driving trace, based on the calculated curvature; and
    determining a speed control point for controlling a speed, based on the calculated proper speed, and calculating a curved road goal acceleration of the determined speed control point;
    wherein the correcting of the driving trace comprises
        comparing performance indices of the calculated curvatures, and wherein each performance index indicates a performance of a curvature, and wherein a smaller performance index indicates a superior performance, and
        determining locations of the feature points of the driving trace, by using feature points having small performance indices of the curvatures, based on the comparison.

9. The method of claim 8, wherein the correcting of the driving trace comprises:
    selecting a number of continuous feature points from among the acquired feature points;
    moving a central feature point among the selected feature points, in the predetermined direction or by a predetermined distance;
    calculating a curvature of a feature point before the feature point is moved, and a curvature of the feature point after the feature point is moved;

comparing the calculated curvatures to determine locations of feature points of the driving trace; and correcting the driving trace, based on the feature points of which the locations are determined.

10. The method of claim 9, wherein the correcting of the driving trace comprises selecting five continuous feature points from among the acquired feature points, setting, as a single set, at least three feature points among the five feature points, and calculating a curvature of each set.

11. The method of claim 8, wherein the calculating of the curvature comprises calculating the curvature, based on at least three feature points among the feature points of the corrected driving trace.

12. The method of claim 8, wherein the calculating of the proper speed comprises calculating the proper speed v according to the following equation:

$$v = \sqrt{a_y \cdot R},$$

wherein $a_y$ denotes a predetermined proper pass lateral acceleration and R denotes a radius of curvature.

13. The method of claim 8, further comprising:

receiving, from a vehicle radar, a signal reflected from a target;

performing signal processing of the received signal;

extracting target information including a travel speed and a travel distance of the target;

selecting a target, based on the extracted target information; and calculating a target goal acceleration, based on target information on the selected target.

14. The method of claim 13, further comprising:

calculating a smaller value between the calculated curved road goal acceleration and the target goal acceleration, as a final goal acceleration of a corresponding point.

* * * * *